US012219316B2

(12) United States Patent
Rapitsch et al.

(10) Patent No.: US 12,219,316 B2
(45) **Date of Patent: *Feb. 4, 2025**

(54) CABLE RETRACTION MECHANISM FOR HEADPHONE DEVICES

(71) Applicant: Sonos, Inc., Santa Barbara, CA (US)

(72) Inventors: Dieter Rapitsch, Wr. Neustadt (AT); Patrice Billaudet, Vienna (AT)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,645

(22) Filed: Nov. 6, 2023

(65) Prior Publication Data

US 2024/0073581 A1 Feb. 29, 2024

Related U.S. Application Data

(63) Continuation of application No. 18/075,232, filed on Dec. 5, 2022, now Pat. No. 11,812,212, which is a (Continued)

(51) Int. Cl.
*H04R 1/10* (2006.01)

(52) U.S. Cl.
CPC ......... *H04R 1/1033* (2013.01); *H04R 1/1008* (2013.01); *H04R 1/1041* (2013.01); *H04R 1/105* (2013.01); *H04R 2420/07* (2013.01)

(58) Field of Classification Search
CPC .. H04R 1/1033; H04R 1/1008; H04R 1/1041; H04R 1/105; H04R 2420/07
(Continued)

(56) References Cited

U.S. PATENT DOCUMENTS 4,597,394 A 7/1986 Sackner
5,440,644 A 8/1995 Farinelli et al.
(Continued)

FOREIGN PATENT DOCUMENTS

EP 1389853 A1 2/2004
JP S49-81137 * 7/1974 .............. H04R 1/10
(Continued)

OTHER PUBLICATIONS

AudioTron Quick Start Guide, Version 1.0, Mar. 2001, 24 pages.
(Continued)

*Primary Examiner* — Vivian C Chin
*Assistant Examiner* — Douglas J Suthers

(57) ABSTRACT

A headphone device including (i) a first and second earpiece, (ii) a headbow adjustably connecting the first and second earpiece, wherein the first and/or the second earpiece is extendable from the headbow, and wherein the headbow includes (a) an inner cavity and (b) a fastener positioned within the inner cavity at a midpoint of the headbow, and (iii) a cable assembly including a cable formed into a sinusoidal pattern when the cable assembly is in a resting position, the cable assembly extending between the first and second earpieces and positioned within the inner cavity in the resting position such that the cable assembly is extendable within the inner cavity from the resting position when the first and/or second earpieces are extended from the headbow, and wherein a midpoint of the cable assembly is fixed, within the inner cavity, at the midpoint of the headbow via the fastener.

20 Claims, 12 Drawing Sheets

Related U.S. Application Data continuation of application No. 17/234,438, filed on Apr. 19, 2021, now Pat. No. 11,523,207.

(60) Provisional application No. 63/013,316, filed on Apr. 21, 2020.

(58) Field of Classification Search
USPC .......................................................... 381/74
See application file for complete search history.

(56) References Cited

U.S. PATENT DOCUMENTS

| | | | | |
|---|---|---|---|---|
| 5,761,320 | A | 6/1998 | Farinelli et al. | |
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2009/0103762 | A1* | 4/2009 | Ishida | H04R 5/0335 381/378 |
| 2015/0289048 | A1* | 10/2015 | Schermerhorn | A63B 33/004 381/376 |
| 2016/0302029 | A1* | 10/2016 | Broadley | H04M 1/6058 |
| 2017/0164090 | A1 | 6/2017 | Taylor | |
| 2020/0314486 | A1 | 10/2020 | Thoresz et al. | |

FOREIGN PATENT DOCUMENTS

| | | | |
|---|---|---|---|
| JP | H08256391 | A | 10/1996 |
| JP | 2011199651 | A | 10/2011 |
| WO | 200153994 | | 7/2001 |
| WO | 2003093950 | A2 | 11/2003 |
| WO | 2019195288 | A1 | 10/2019 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability and Written Opinion, mailed on Nov. 3, 2022, issued in connection with International Application No. PCT/US2021/027984, filed on Oct. 25, 2022, 9 pages.
International Bureau, International Search Report and Written Opinion mailed on Jul. 14, 2021, issued in connection with International Application No. PCT/US2021/027984, filed on Apr. 19, 2021, 12 pages.
Japanese Patent Office, Notice of Reasons for Refusal and Translation mailed on Jul. 26, 2022, issued in connection with Japanese Patent Application No. 2021-071832, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jun. 24, 2022, issued in connection with U.S. Appl. No. 17/234,438, filed Apr. 19, 2021, 11 pages.
Non-Final Office Action mailed on Apr. 26, 2023, issued in connection with U.S. Appl. No. 18/075,232, filed Dec. 5, 2022, 15 pages.
Notice of Allowance mailed on Oct. 19, 2022, issued in connection with U.S. Appl. No. 17/234,438, filed Apr. 19, 2021, 8 pages.
Notice of Allowance mailed on Aug. 30, 2023, issued in connection with U.S. Appl. No. 18/075,232, filed Dec. 5, 2022, 8 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

CABLE RETRACTION MECHANISM FOR HEADPHONE DEVICES

CROSS-REFERENCE TO RELATED APPLICATIONS

This application is a continuation of U.S. patent application Ser. No. 18/075,232, filed Dec. 5, 2022, which is a continuation of U.S. patent application Ser. No. 17/234,438, filed Apr. 19, 2021, which claims the benefit of priority under 35 U.S.C. § 119 to U.S. Provisional Patent App. No. 63/013,316, filed Apr. 21, 2020, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
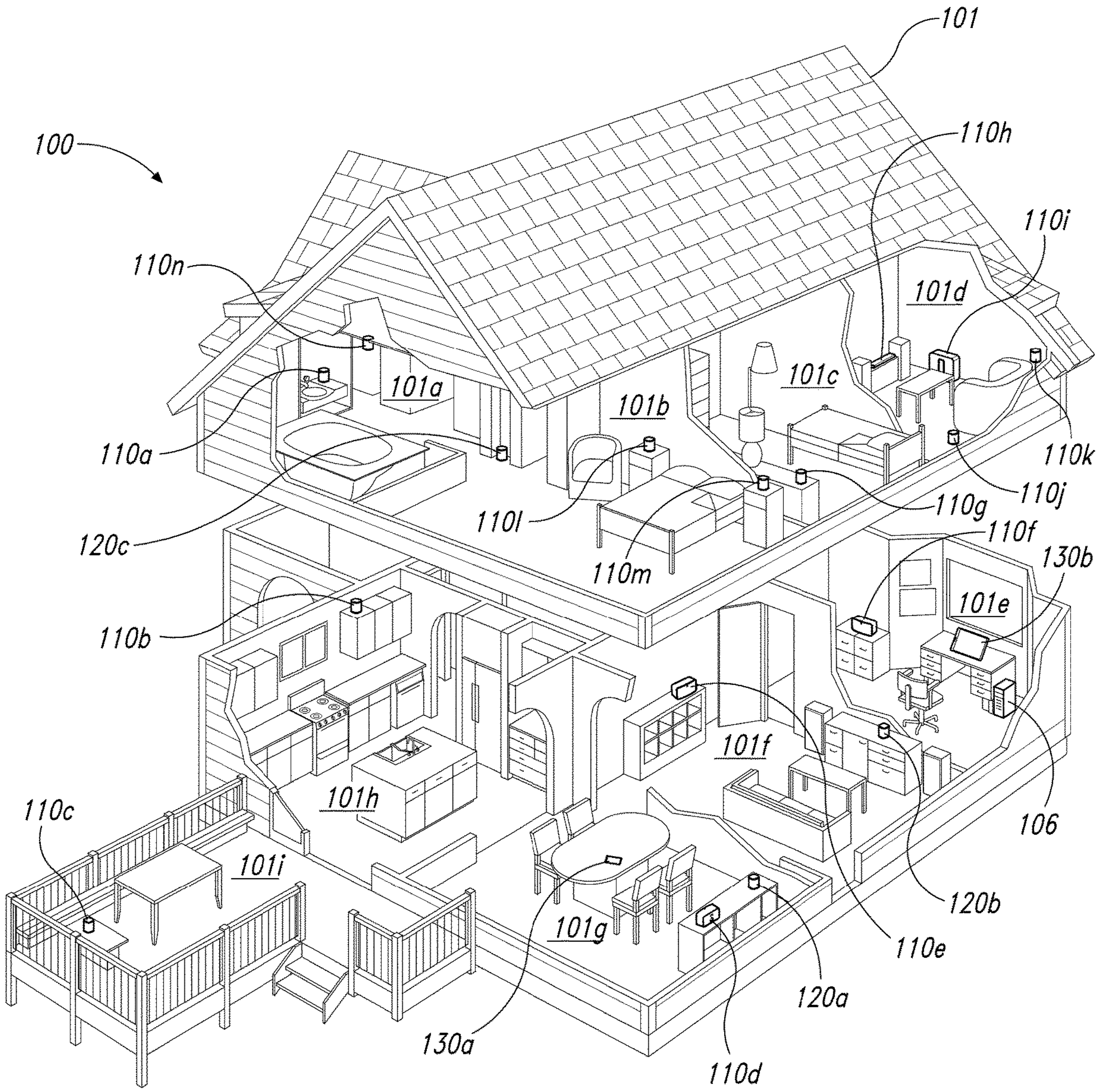
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Building upon its success in networked media players, Sonos has begun researching and developing networked headphone devices to expand upon the listening options available to Sonos users. Embodiments described herein relate to headphone devices with improved wireless capabilities.

Consumers typically expect Bluetooth enabled devices, such as Bluetooth headphones, to have a limited communication range. For example, consumers expect that music streaming from their smartphone to a pair of Bluetooth headphones will dropout if they leave the Bluetooth headphones on as they walk away from their smartphone (e.g., they walk out of the room without their smartphone). As a result, consumers generally expect that they need to keep a pair of electronic devices that communicate via Bluetooth within close range of each other (e.g., kept within about 5-15 feet of each other) to maintain the connection. Given this relatively small range expectation for Bluetooth devices, conventional designs for such Bluetooth headphones typically only employ a single antenna that is integrated into the same earpiece as the communication circuitry (e.g., the Bluetooth receiver).

Consumers, however, have significantly higher range expectations for WiFi enabled devices than for Bluetooth enabled devices. For example, consumers expect a WiFi enabled tablet computer to be able to access the Internet via their wireless access point from every room in their home. As a result, a consumer may expect a pair of WiFi enabled headphones to have the same type of reliable Internet connection to their wireless access point that they experience while using a tablet. These expectations require a WiFi enabled device to successfully receive and transmit information at significantly greater ranges compared to Bluetooth enabled devices, including through walls, floors and/or other objects that tend to attenuate and/or reflect electromagnetic waves (e.g., concrete, metal, etc.).

One challenge with a WiFi enabled device in a headphone form factor is the electrical properties of the human head. For example, human heads significantly reflect and/or attenuate electromagnetic waves at the frequencies employed for WiFi communication (e.g., 2.4 Gigahertz (GHz) and 5 GHz). As a result, an antenna disposed in an earpiece on one side of a user's head has a significant null area adjacent to it, through which wireless performance is severely compromised. Such a large and deep null area is not typically encountered in traditional WiFi enabled devices, such as laptop computers. In the context of Bluetooth headphones, the range expectation of users is so small that a single antenna with a large null area is still sufficient to provide an acceptable user experience despite the above-described radiation pattern nulls introduced by a human head. Employing a conventional single antenna design for a WiFi enabled headphone, however, may not provide a stable connection at the ranges a consumer would typically expect for a WiFi enabled device.

One approach to improve the wireless performance of headphones is to integrate multiple antennas into the headphones, including at least one antenna in each earpiece to provide spatial and pattern diversity. Due to the high attenuation of electromagnetic waves travelling through human head, integrating multiple antennas in different parts of a headphone, such as both sides of the head, can result in antenna patterns with improved pattern diversity (e.g., complementary antenna patterns). However, the wireless headphones may nonetheless include communication and processing circuitry, including, for instance, the wireless receiver, that is housed in only one of the earpieces. Consequently, incorporating an additional antenna into an earpiece that is remote from the communication circuitry raises a host of new technical challenges. Many of these challenges are discussed in provisional application No. 62/883,535, titled "Spatial Antenna Diversity Techniques for Headphone Devices," filed on Aug. 6, 2019, the disclosure of which is hereby incorporated by reference in its entirety.

One such challenge is providing for adequate communication between the earpieces. For example, the remote antenna may receive a relatively weak wireless signal that must be communicated via a cable assembly, across the headbow of the headphones, to the communication circuitry while maintaining the integrity of the signal. Thus, a relatively robust conductor may be employed, such as a coaxial cable. Further, the remote earpiece may include additional electronic components to facilitate receipt of a wireless signal such as an antenna tuner and/or an amplifier (e.g., a low-noise amplifier (LNA)). Accordingly, the cable assembly may include additional conductors to carry control signals from the communication circuitry to the additional electronic components in the remote earpiece. Still further, the wireless headphones may contain one or more microphones that may be disposed within one or both earpieces. The microphone(s) may be used to receive voice commands from the user, and/or for the purpose of active noise cancellation. Once again, the cable assembly may include additional conductors to relay the corresponding microphone signals between earpieces. Moreover, each of the conductors discussed above may be included in addition to the conductors that would traditionally be present to transfer power and/or carry audio signals to the transducer in the remote earpiece. Numerous other examples of additional conductors that may be included in the cable assembly, which may enable additional features of the wireless headphones, are also possible.

As a result, the cable assembly that communicatively connects the two earpieces of the wireless headphones discussed herein may be substantially larger than those found in traditional headphones, which typically provide only an audio signal to the transducer in the remote earpiece. For instance, a cable assembly incorporating each of the required conductors for the improved wireless headphones discussed in the examples herein may have a diameter greater than 4 mm. This is nearly twice the diameter of a typical headbow cable in a pair of Bluetooth-only headphones, for example.

Compounding the challenges in the design of the cable assembly is a wide variation in human head sizes in combination with user comfort preferences. Headphones that include two earpieces connected by a headbow are generally not a one-size-fits-all form factor, and thus consumers expect the earpieces of a pair of headphones to be adjustable (e.g., extendable and retractable) with respect to the headbow. Thus, the cable that communicatively connects the two earpieces must be integrated into the headbow in a way that accommodates such adjustments while maintaining the integrity of the relatively large-diameter cable.

In some cases, the cable may be positioned within the headbow in a meandering fashion, such that the overall length of the cable is greater than the length of the headbow itself. This may allow the earpieces to be extended from the headbow, thus utilizing the additional cable length. However, if the extension and retraction of the excess cable length is not managed in some way, it may lead to damage or deterioration of the cable. For instance, adjusting the earpieces back into their starting position with respect to the headbow may force the excess length of cable back into the headbow. Absent some mechanism to retract the cable into the headbow as the earpieces move, this adjustment of the earpieces may cause the cable to bunch up, bind on itself, or bind on the headbow, among other possibilities. This may result in damage to the cable, or in some cases, prevent the movement of the earpieces with respect to the headbow.

Thus, a cable assembly may be provided that facilitates retraction of the cable from its extended position as the earpieces are adjusted back to their starting position. In some embodiments, the cable assembly may include a cable that is heat-formed into a flexible shape that enables the cable to expand relatively easily. For example, the cable may include a cable jacket that is at least partially formed from an elastomeric material, such as a thermoplastic elastomer, that is heat formed into a sinusoidal pattern. The cable may then be positioned within an inner cavity of the headbow, connecting the two earpieces. When a user adjusts the headphones by extending one or both earpieces from the headbow, the sinusoidal shape of the cable may flatten as the cable extends with the earpieces.

Conversely, when the user returns the earpieces to their starting position with respect to the headbow, the elastomeric material of the cable jacket will urge the cable back toward its original resting shape. In this way, the cable may expand and contract in a more controlled fashion and thereby reduce the chances of the cable bunching up or binding on itself or the inner cavity of the headbow.

Other arrangements of the cable assembly and other retraction mechanisms are also possible. For example, in addition to or as an alternative to an elastomeric cable jacket, the cable assembly may include one or more additional components coupled to the cable that tend to return to their original shape when deformed. In some implementations, an elastomeric band may be coupled to the cable in its resting position. For instance, the cable may be formed into a sinusoidal pattern, as discussed above, having a series of peaks and valleys. An elastomeric band may be coupled to the cable at the midpoint of each sinusoidal wave, between the successive peaks and valleys. In some cases, the elastomeric band may be coupled to the cable with an adhesive. In other examples, it may be fused or otherwise integrated with the cable jacket as part of the heat-forming process. Other examples are also possible.

When the cable assembly including the elastomeric band expands as the earpieces are extended, as discussed above, the sinusoidal shape of the cable will begin to flatten and the elastomeric band will stretch, storing potential energy similar to a spring. When the earpieces are adjusted in the opposite direction, back toward the headbow, the energy in the elastomeric band will be released, tending to bias the cable back toward its original sinusoidal shape.

In some examples, the cable assembly may include multiple elastomeric bands. For instance, an elastomeric band may be coupled to the series of peaks in the sinusoidal pattern, while another elastomeric band is coupled to the series of valleys. In still further examples, the cable assembly may include an elastomeric strip or belt to which the cable is coupled or affixed. For example, the elastomeric strip may extend lengthwise along the cable and may have a width that encompasses the peaks and valleys of the cable's sinusoidal resting shape. Thus, extending the cable will also extend the entire elastomeric strip, which will then impart a returning force to the cable when the earpieces are retracted, similar to the examples above.

In some implementations, the headbow may also be configured to facilitate the retraction of the cable assembly after it has been extended. For example, the inner cavity of the headbow, in which the cable assembly may be positioned, may be formed with a series of guides that dictate a path for the cable assembly as it returns to its resting position. For example, the guides may take the form of a series of protrusions that extend into the inner cavity of the headbow. The protrusions may include, for example, one or more inclined edges that may urge the cable assembly in a particular direction if the cable assembly is forced against it. This may reduce the likelihood that a portion of the cable assembly buckles or becomes otherwise misaligned within the inner cavity as it is retracted.

In some implementations, the headbow may also include features that fix one or more portions of the cable assembly in a certain position with respect to the headbow. For example, the headbow may include a rib that extends into the inner cavity at the midpoint of the headbow. The center rib may fix, via an interference fit, for example, the midpoint of the cable assembly in place within the inner cavity. This may increase the likelihood that the extension and retraction of the cable assembly is distributed more evenly along its length, assuming the earpieces are extended equally or approximately equally when adjusted by a user.

Additionally or alternatively, the headbow may be configured to bias the cable assembly back toward its resting position after the cable assembly has been extended. For example, the headbow may include one or more flexible tabs extending into the inner cavity. When the cable assembly is extended, the cable assembly may push the flexible tabs in a first direction, e.g., longitudinally along the length of the headbow. Then, when the earpieces are retracted, the tabs may provide a returning force to the cable assembly in the opposite direction, thereby facilitating the return of the cable assembly to its original resting position within the inner cavity of the headbow. In some cases, the flexible tabs may be formed from an elastomeric material, although other configurations are also possible. For instance, the flexible tabs may be formed from another resilient material, such as metal, or may take the form of a rigid tab coupled to a hinge spring, among other examples. Further, the example retraction mechanisms for the headphone cable assembly discussed herein may be used individually or in any combination.

In some embodiments, for instance, a headphone device is provided including a first earpiece having a first antenna at least partially disposed within the first earpiece and a second earpiece having a second antenna at least partially disposed within the second earpiece. The headphone device also includes a headbow adjustably connecting the first earpiece and the second earpiece, where the first earpiece and second earpiece are each extendable from the headbow, and where the headbow comprises an inner cavity. The headphone device also includes a cable assembly including a cable and extending between the first earpiece and the second earpiece, where the cable assembly is at least partially formed from an elastomeric material, and where the cable assembly is positioned within the inner cavity of the headbow in a resting position such that the cable assembly is extendable within the inner cavity of the headbow from the resting position when one or both of the first and second earpieces are extended from the headbow.

In another aspect, a method for assembling a headphone device is provided. The method includes at least partially disposing a first antenna within a first earpiece and at least partially disposing a second antenna within a second earpiece. The method also includes adjustably connecting the first earpiece and the second earpiece with a headbow having an inner cavity, where the first earpiece and second earpiece are each extendable from the headbow. The method also includes extending a cable assembly between the first earpiece and the second earpiece, where the cable assembly includes a cable and is at least partially formed from an elastomeric material, and where the cable assembly is positioned within the inner cavity of the headbow in a resting position such that the cable assembly is extendable within the inner cavity of the headbow from the resting position when one or both of the first and second earpieces are extended from the headbow.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
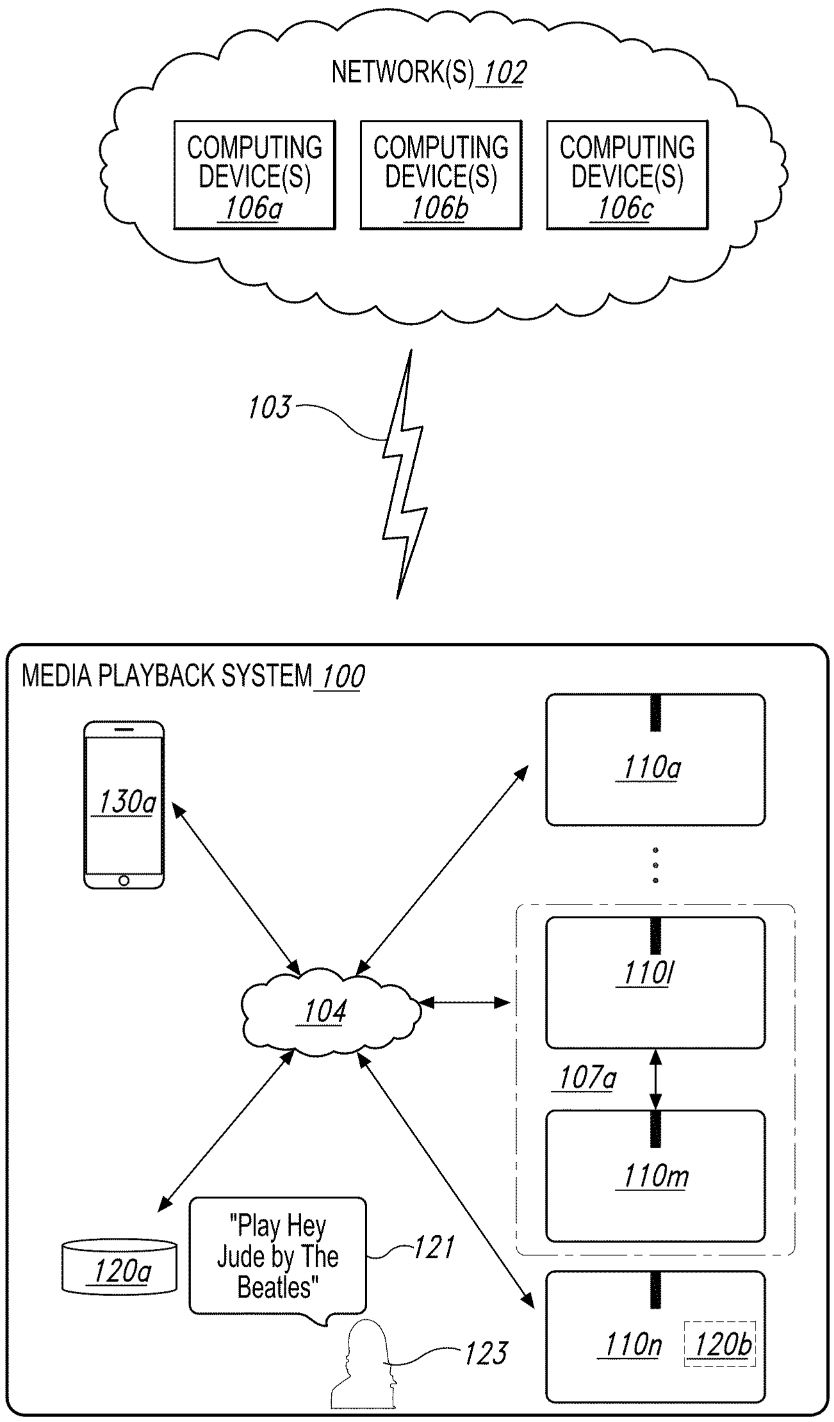
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
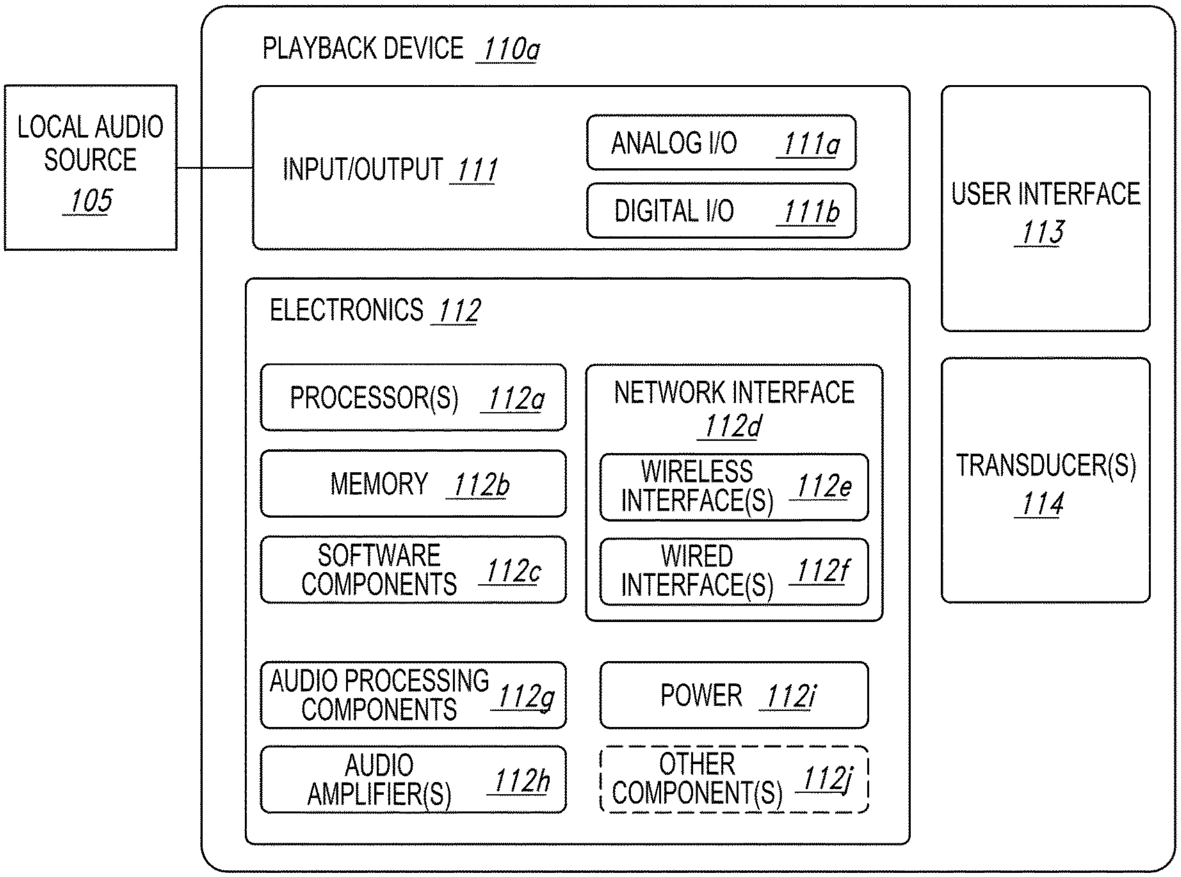
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
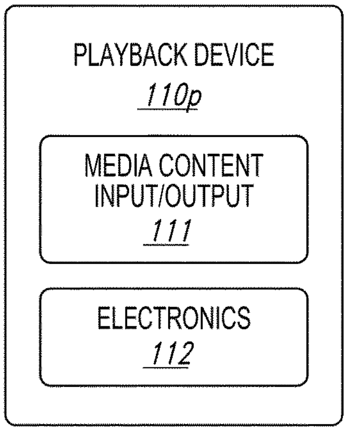
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
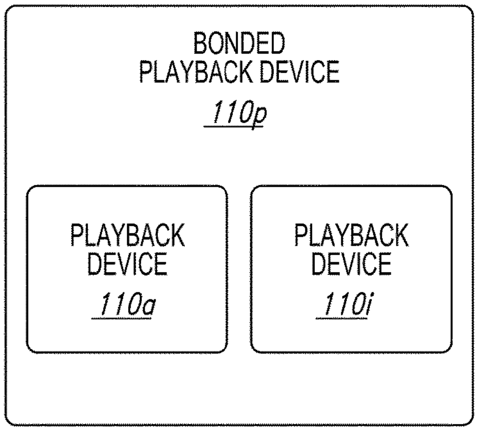
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figure 1F:
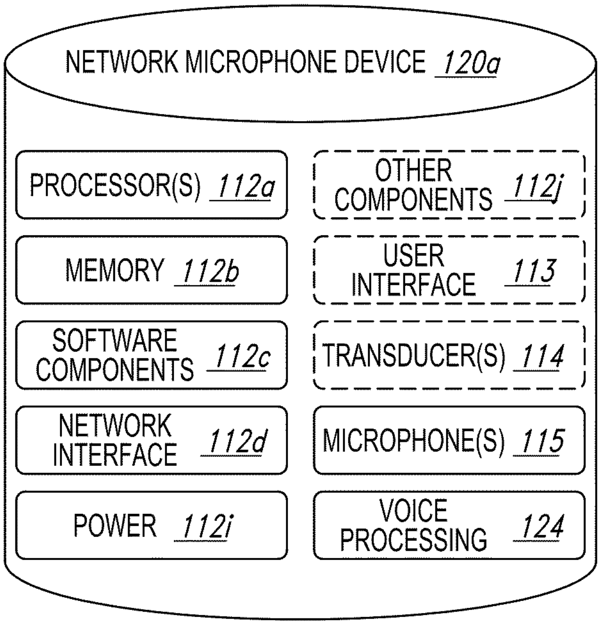
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
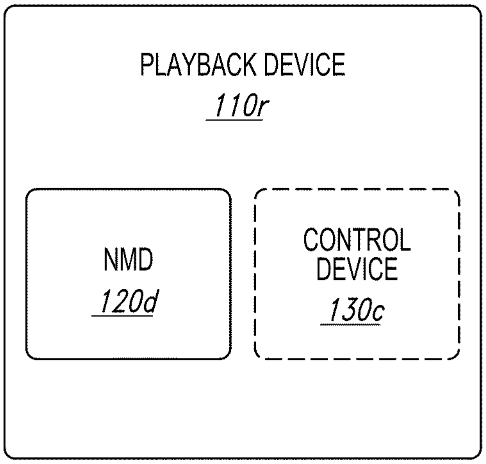
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
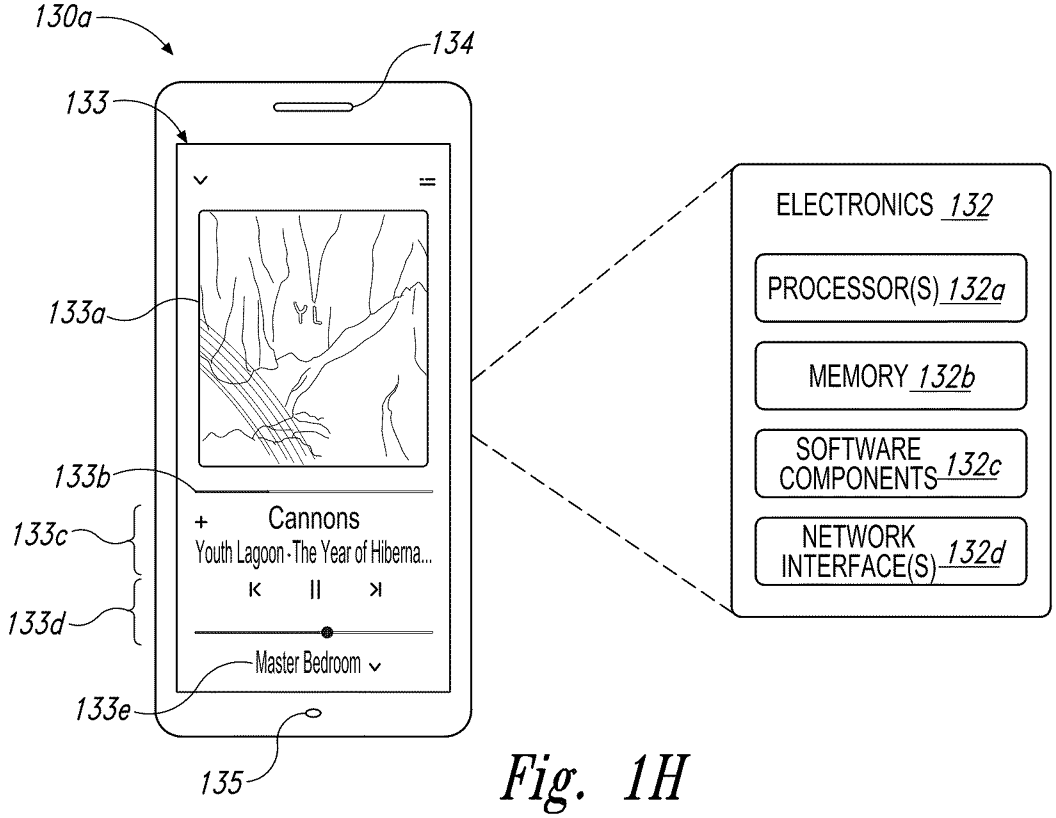
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Headphone Devices

In some embodiments, a playback device and/or NMD as discussed in the examples above may take the form of a headphone device (e.g., a WiFi enabled headphone device, a WiFi and Bluetooth enabled headphone device, etc.) including multiple spatially diverse antennas for improved wireless performance. The headphone devices discussed herein may be configured to operate in a variety of operational modes (e.g., WiFi, Bluetooth, home theater, LTE, 5G, etc.), and may also transition between operational modes, based on the wireless communication channel and type of media to be played by the headphone device at a given time.

Figure 2:
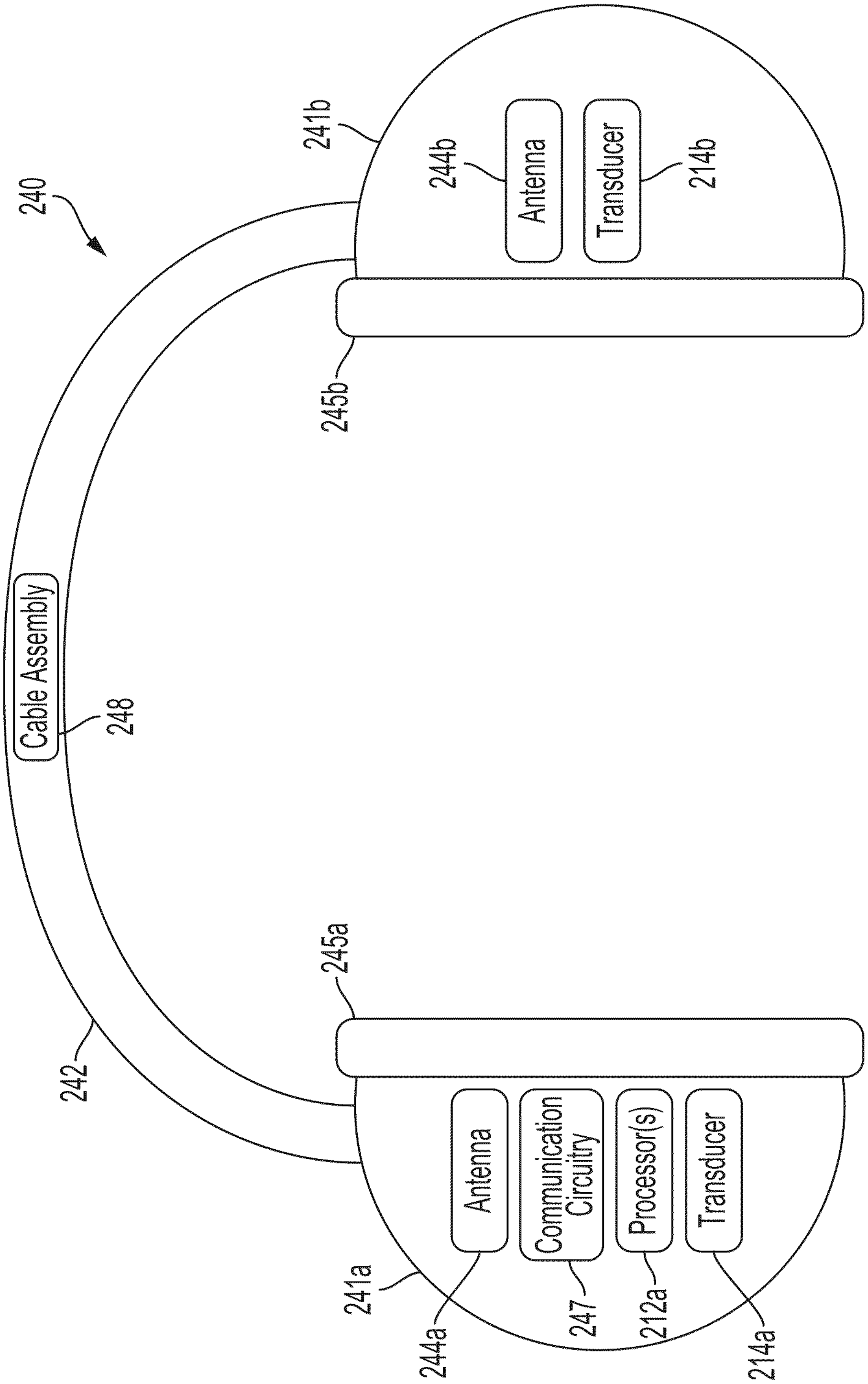
FIG. 2 is a schematic diagram of a headphone device, according to an example embodiment.

FIG. 2 shows a schematic drawing of a headphone device 240, according to an example embodiment. The headphone device 240 may be implemented as a wearable device such as over-ear headphones, in-ear headphones, or on-ear headphones. As shown, the headphone device 240 includes a headbow 242 that couples a first earpiece 241*a* to a second earpiece 241*b*. Each of the earpieces 241*a* and 241*b* may house any portion of the electronic components in the headphone device 240 (e.g., transducers 214*a* and 214*b*, amplifiers, filters, processor(s) 212, memory, receivers, transmitters, switches, etc.). Additionally, one or both earpieces 241*a* and 241*b* may house antennas 244*a* and 244*b* and communication circuitry 247. In some embodiments, the collection of above-listed components is said to be enclosed within a headphone housing, which includes the combination of the first and second earpieces 241*a*, 241*b* and the headbow 242.

In some example embodiments, one or more of the earpieces 241*a* and 241*b* may further include a user interface for controlling audio playback, volume level, and other functions. The user interface may include any of a variety of control elements such as a button, a capacitive touch surface, and/or a switch.

As shown in FIG. 2, the headphone device 240 may further include ear cushions 245*a* and 245*b* that are coupled to earpieces 241*a* and 241*b*, respectively. The ear cushions 245*a* and 245*b* may provide a soft barrier between the head of a user and the earpieces 241*a* and 241*b*, respectively, to improve user comfort and/or provide acoustic isolation from the surrounding environment (e.g., passive noise reduction (PNR)).

Further, both the first earpiece 241*a* and the second earpiece 241*b* are individually extendable from the headbow 242 in order to increase the overall length of the headphone device 240. This may allow users to adjust the earpieces with respect to the headbow 242 to customize the fit of the headphone 240 to their liking. Similarly, each of the earpieces 241*a* and 241*b* may be rotatable at their respective connections to the headbow 242, to provide additional degrees of freedom for a user to customize their fit.

In some embodiments, the communication circuitry 247 may comprise any of a variety of electronic components that enable transmission and/or receipt of wireless signals via antennas 244*a* and 244*b*. Examples of such components include receivers, transmitters, processor(s) 212, memory, amplifiers, switches, and/or filters.

In some embodiments, the antennas 244*a* and 244*b* are multi-band antennas configured to operate on several frequency bands (e.g., the 2.4 GHz band and the 5 GHz band), such as a dual-band inverted-F antenna (IFA). Further, in some examples, one or more of the antennas 244*a* and 244*b* may be passive multi-band antennas. In other examples, one or more of the antennas 244*a* and 244*b* may be active multi-band antennas. Still further, one of antennas 244*a* or 244*b* may be an active multi-band antenna while the other antenna may be a passive multi-band antenna. In other embodiments, one or more of antennas 244*a* and 244*b* may be single-band antennas configured to operate on a single frequency band (e.g., the 2.4 GHz band and the 5 GHz band).

It should be appreciated that the headphone device 240 may employ any number of antennas and is not limited to implementations with only two antennas. For example, the headphone device 240 may comprise two antennas for communication over WiFi and a third antenna for communication over Bluetooth. Additionally or alternatively, the headphone device 240 may comprise an additional antenna to enable near-field communication (NFC).

In some embodiments, the antennas 244*a* and 244*b* are physically separated from each other (i.e., spatially diverse). This is desirable while a user/wearer is wearing the headphone device 240, as a human head may attenuate and/or reflect electromagnetic waves causing RF signal interruption. Using a combination of antennas 244*a* and 244*b* in each earpiece 241*a* and 241*b* (i.e., on either side of the user's head when in use) may reduce RF signal interruption caused by movement and/or position of the user's head while wearing the headphones. The communication circuitry 247 may allow for combining and/or switching between the antennas 244*a* and 244*b* during operation based on, for example, which antenna 244*a* or 244*b* receives a stronger signal at a given time. Further, the antennas 244*a* and/or 244*b* may be disposed in portions of the headphone housing other than the earpieces 241*a* and 241*b*. For example, one or more of the antennas 244*a* and/or 244*b* may be at least partially disposed in the headbow 242.

The cable assembly 248 may include a cable that connects the first earpiece 241*a* and the second earpiece 241*b* and facilitates communications between the respective components in the two earpieces. The cable may include a plurality of conductors for carrying out the numerous functions of the headphone device 240. The cable assembly 248 may be housed within the headbow 242, as shown schematically in FIG. 2 and discussed in further detail below.

Figure 3:
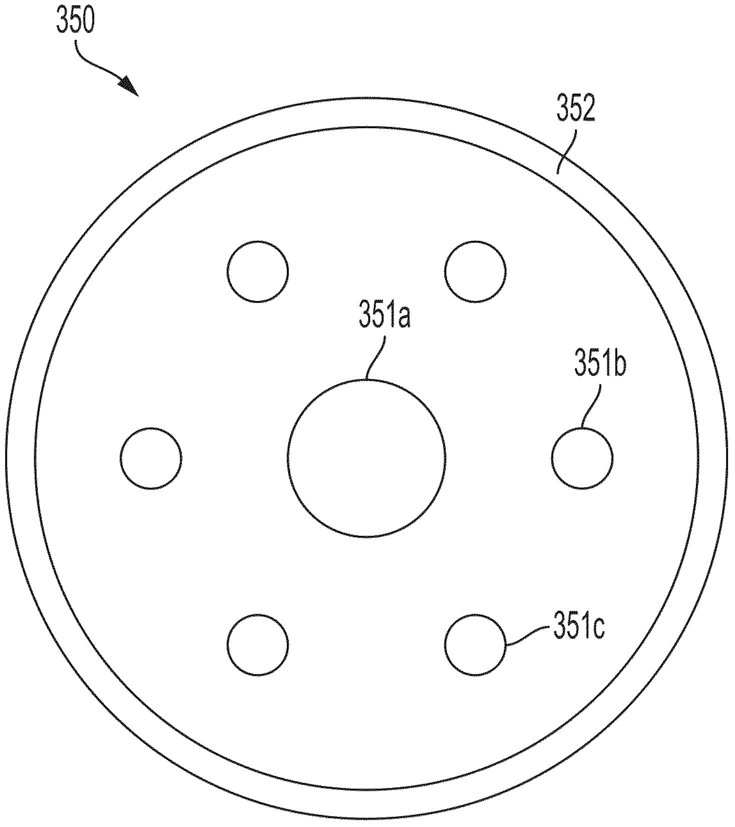
FIG. 3 is a schematic cross-sectional diagram of a cable, according to an example embodiment.

FIG. 3 shows a cross-sectional view of an example cable 350, which may form a part of the cable assembly 248. The cable 350 may include a plurality of conductors, such as a first conductor 351*a* for detected wireless signals (e.g., wireless signals detected via the remote antenna 244*b*), a second conductor 351*b* for power transfer, a third conductor 351*c* for carrying audio signals (e.g., audio signals to drive the remote transducer 214*b*). Additional conductors are shown in FIG. 3 and numerous other conductors are also possible, each of which may correspond to additional functionalities of the headphone device 240, such as conductors for carrying microphone signals corresponding to voice commands received from a user, or microphone signals used for active noise cancellation, as so on.

Due to the number of conductors that may be present, the cable 350 may be significantly larger than a typical headbow cable that might be found in, for example, a pair of Bluetooth-only headphones having a single antenna. For example, the cable 350 may have an outer diameter in the range of 3.5 mm to 6.5 mm depending on the number of conductors included, which can be two to three times larger than some conventional designs. Similarly, some designs of the cable 350 may have an outer diameter within the range of 4.0 mm to 6.0 mm, including designs that range between 4.0 mm and 5.0 mm. In some cases, the cable 350 may have an outer diameter that is within the range of 4.2 mm to 4.8 mm. Other examples are also possible.

The cable 350 may also include a cable jacket 352, as shown in FIG. 3, which may provide protection and/or insulation for the conductors within. In some implementations, the cable jacket 352 may form some or all of a retraction mechanism for withdrawing the cable assembly 248 within the headbow 242, as further discussed below.

Figure 4A:
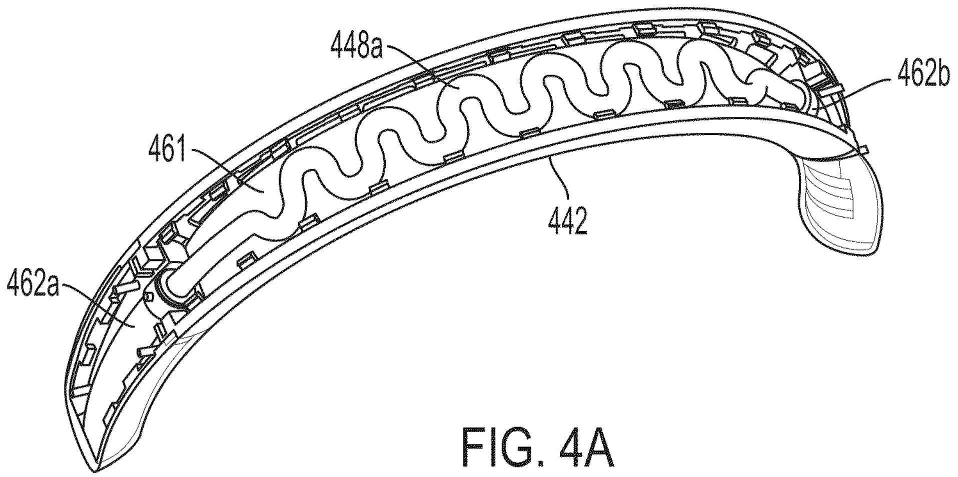
FIG. 4A is a partial cutaway view of a headbow of a headphone device, according to an example implementation.

Turning now to FIG. 4A, a partial cutaway view of a headbow 442 of an example headphone device is shown. The headphone device may be similar to, for example, the headphone device 240 shown in FIG. 2. In FIG. 4A, a top portion of the headbow 442 is removed, revealing an inner cavity 461 within the headbow 442. Positioned within the inner cavity 461 is a cable assembly 448*a*, which may be similar to the cable assembly 248 discussed above. For example, the cable assembly 448*a* may include a cable, such as the cable 350, including a plurality of conductors and having a relatively large diameter.

Figure 4B:
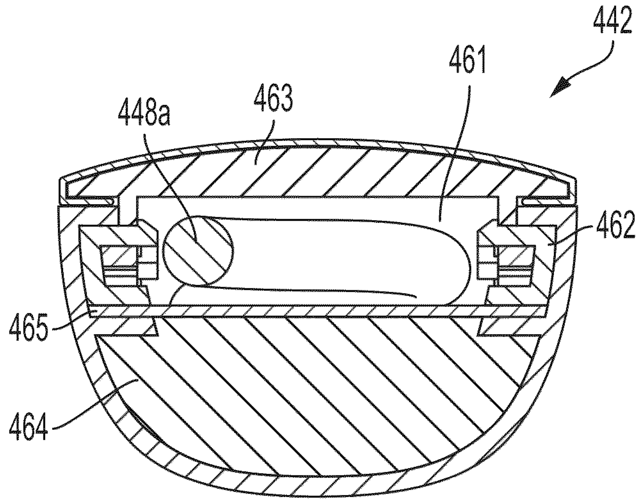
FIG. 4B is a cross-sectional view of the headbow shown in FIG. 4A.

FIG. 4B shows a cross-sectional view of the headbow 442 shown in FIG. 4A, with the addition of a top portion 463 of the headbow 442. The top portion 463 of the headbow 442 encloses the inner cavity 461, within which the cable assembly 448*a* can be seen. The top portion 463 of the headbow 442 may attach on to the headbow 442 via a set of snaps 462, although numerous other couplings are possible. The cross-section of the headbow 442 shown in FIG. 4B also illustrates a foam section 464, which may provide shape for the headbow 442 as well as enhance user comfort. Further, a sheet 465 (e.g., a plastic sheet) may separate the foam section 464 from the inner cavity 461 and provide a smooth surface on which the cable assembly 448*a* may extend and retract, as further discussed below.

As shown in FIGS. 4A and 4B, the cable assembly 448*a* is formed in a sinusoidal shape, allowing for a length of cable that is greater than the corresponding length of the headbow 442 to be housed within the inner cavity 461. A first end of the cable assembly 448*a* may be fixed within or otherwise coupled to a first shaft 462*a* that extends into the inner cavity 461 of the headbow 442. Similarly, a second end of the cable assembly 448*a* is fixed within a second shaft 462*b* on the opposite side of the headbow 442. The first and second shafts 462*a* and 462*b* are connected to the respective first and second earpieces of the headphone device and are both axially slidable within the inner cavity 461 of the headbow 442. In this way, the earpieces may be extended from the headbow 442 to allow for user adjustment. For example, the first shaft 462*a* shown in FIG. 4A is slidable downward and out of the inner cavity 461 of the headbow 442. The second shaft 462*b* is similarly slidable on the opposite end of the headbow 442.

In conjunction with the movement of the first and/or second earpieces, the cable assembly 448*a* that is fixed within the first shaft 462*a* and the second shaft 462*b* will also be extended within the inner cavity 461 of the headbow 442. In particular, the sinusoidal shape of the cable assembly 448*a* will flatten as the cable assembly 448*a* lengthens. Accordingly, the cable assembly 448*a* may be at least partially formed form a flexible material that allows it to expand in this way without damaging the plurality of conductors.

Further, and as noted previously, the cable assembly 448*a* may be at least partially formed from a material that is elastically flexible such that the cable assembly 448*a* will contract back toward its original shape when the earpieces are retracted. For example, the cable assembly 448*a* may be at least partially formed from an elastomeric material, such as a thermoplastic elastomer. In some implementations, for instance, the cable assembly 448*a* may include a cable 350 having a cable jacket 351 that is thermoformed around the cable 350 in a resting position, such as the sinusoidal pattern shown in FIG. 4A having a series of peaks and valleys. Thus, when the first earpiece of the headphone device is retracted and the first shaft 462*a* slides back upward into the inner cavity 461 of the headbow 442, the elastomeric material of the cable assembly 448*a* will tend to draw the cable assembly 448*a* back toward its resting position. This configuration may advantageously reduce the likelihood that the cable assembly 448*a* is forced into the inner cavity 461 in a way that damages the cable assembly 448*a*.

Figure 4C:
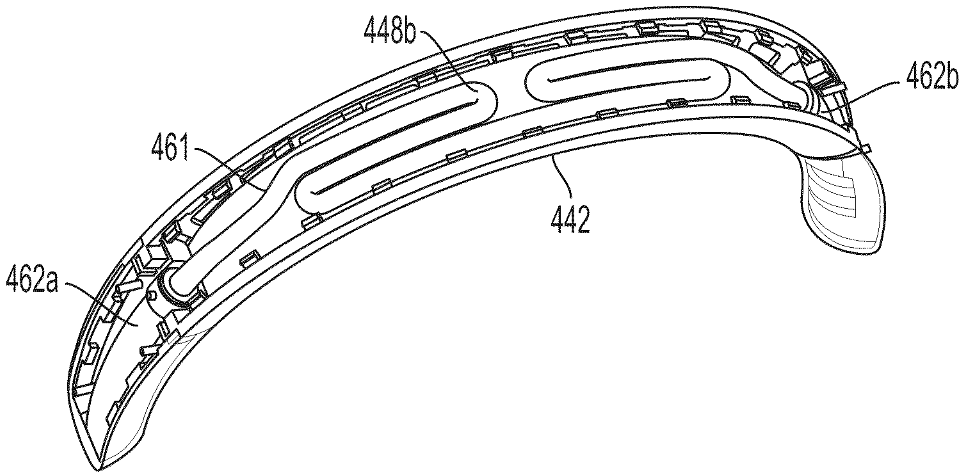
FIG. 4C is a is a partial cutaway view of a headbow of a headphone device, according to another example implementation.

The sinusoidal pattern of the cable assembly 448*a* in FIG. 4A shows just one example of how a cable assembly as discussed herein may be positioned within the inner cavity 461 of the headbow 442. For instance, FIG. 4C shows a partial cutaway view of the headbow 442 including a cable assembly 448*b* in an alternative configuration, which may be referred to as an S-shape pattern. This pattern may similarly allow the cable assembly 448*b* to be extended within the inner cavity 461 as one or more of the earpieces of the headphone device are extended. Further, the cable assembly 448*b* may be at least partially formed from an elastomeric material that tends to return the cable assembly 448*b* to its resting S-shape position when the earpieces are retracted. Other patterns for the resting position of a cable assembly within the inner cavity 461 of the headbow 442 are also possible.

Figure 5A:
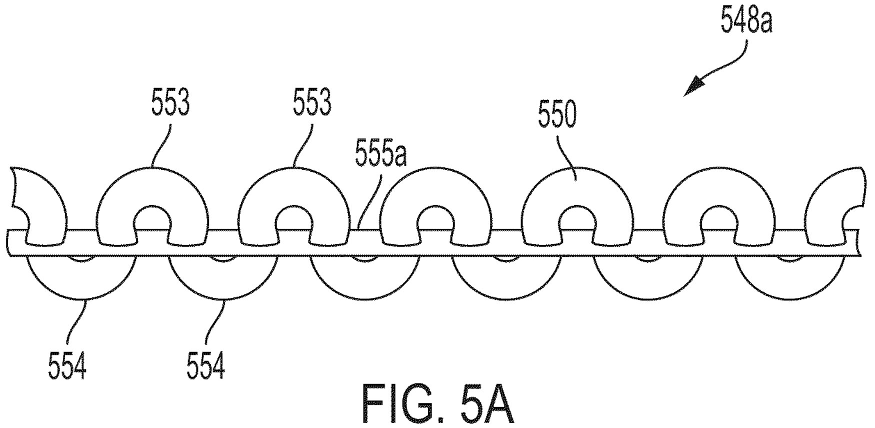
FIG. 5A is a cable assembly according to an example implementation.
Figure 5B:
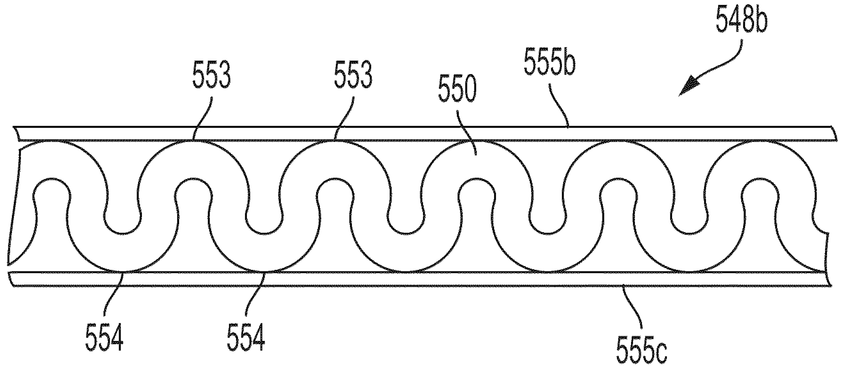
FIG. 5B is a cable assembly according to another example implementation.
Figure 5C:
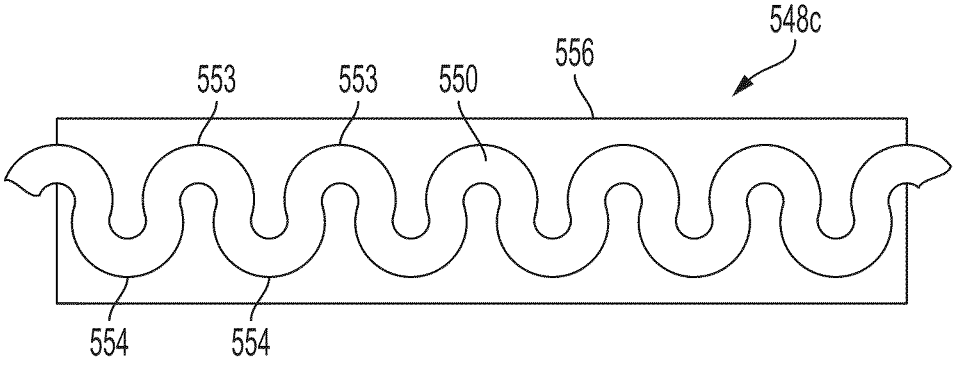
FIG. 5C is a cable assembly according to another example implementation.

In some implementations, the example cable assemblies discussed herein may include other features that facilitate the retraction of the cable assembly to its resting position. For example, FIGS. 5A-5C show several embodiments in which a cable 550 is coupled to an elastomeric band or strip that may impart a restorative force to the cable 550. The examples shown in FIGS. 5A-5C include features that may be included, for example, in the example cable assemblies 448*a* and 448*b* shown in FIGS. 4A-4C.

For instance, FIG. 5A shows a sinusoidally-shaped cable assembly 548*a* in a resting position, including a series of peaks 553 and a series of valleys 554. The cable assembly 548*a* also includes an elastomeric band 555*a* coupled to the cable 550 at a plurality of connection points between the series of peaks 553 and valleys 554. In some examples, the elastomeric band 555*a* may be formed from the same elastomeric material as the cable jacket surrounding the cable 550 and may be thermoformed with the cable jacket as an integrated structure. In other examples, the elastomeric band 555*a* may be a separate component, of the same or a different elastomeric material, that is coupled to the cable jacket as an additional assembly step. As shown in FIG. 5A, the elastomeric band 555*a* may be coupled to the cable 550 such that the cable 500 passes through pre-formed holes in the elastomeric band 555*a*. In some cases, the elastomeric band 555*a* may additionally or alternatively be coupled to the cable 550 using an adhesive. Other examples are also possible.

FIG. 5B shows another example cable assembly 548*b* in which two elastomeric bands 555*b* and 555*c* are coupled to the cable 550. For example, a first elastomeric band 555*b* is coupled to the cable 550 at a plurality of peaks 553 in the series of peaks 553. For instance, the first elastomeric band 555*b* may be coupled to every peak, or every other peak, along the length of the cable 550. Similarly, a second elastomeric band 555*c* is coupled to the cable 550 at a plurality of valleys 554 in the series of valleys 554. As above, the elastomeric bands 555*b* and 555*c* may be formed as an integral part of the cable jacket, or attached to the cable with an adhesive, among other possibilities.

FIG. 5C shows yet another example cable assembly 548*c* that includes an elastomeric strip 556 that is coupled to the cable 550 at a plurality of points along the sinusoidal pattern. For instance, the elastomeric strip 556 may have a width that encompasses the series of peaks 553 and the series of valleys 554. Accordingly, the elastomeric strip 556 may be coupled to the cable 500 at one or more peaks 553, one or more valleys 554, and/or one or more additional points therebetween. As in the examples above, the elastomeric strip 556 may be formed integrally with the cable jacket or may be a separate component that is coupled to the cable 550. The example cable assembly 548*c* shown in FIG. 5C includes a single elastomeric strip 556 arranged on one side of the cable 550, which may be positioned, for example, against the sheet 465 of the inner cavity 461 of the headbow 442, as shown in FIG. 4B. In some other embodiments, two elastomeric strips 556 may be included that sandwich the cable 550 therebetween. Other arrangements are also possible.

In some implementations, and with reference to FIG. 4A, the elastomeric band(s) and/or elastomeric strip(s) shown in FIGS. 5A-5C may extend along the length of the inner cavity 461 and be coupled to one or both of the first shaft 462*a* and second shaft 462*b*. This may allow for the force that expands the cable assembly, as a result of the first shaft 462*a* being extended, for example, to be applied more directly to the elastomeric band(s) and/or strip(s). In other embodiments, limited space or other design constraints may not allow for such a connection, and the elastomeric band(s) and/or strips(s) may extend for less than the entire length of the cable assembly 448 within the headbow 442.

The elastomeric band(s) and/or elastomeric strip(s) described herein may comprise an elastomeric material. The elastomeric material may be integrated into the elastomeric band in any of a variety of ways. In some embodiments, the elastomeric band may be constructed entirely from one or more elastomeric materials (e.g., a sheet of elastomeric material, a band woven from elastomeric thread, etc.). In other embodiments, the elastomeric band may comprise a fabric formed from fibers (e.g., natural fibers and/or artificial fibers) that are woven, knitted, and/or braided together. In these embodiments, the elastomeric material may be integrated into the fabric. Some example elastomeric materials include rubbers, thermoplastic elastomers, and elastolefins. Some example rubbers include latex rubbers, silicone rubbers, nitrile rubbers, butyl rubbers, chloroprene rubbers, styrene-butadiene rubbers, and polyacrylic rubbers.

In addition to the features of the example cable assemblies discussed above, the headbow of the headphone device may also include elements that facilitate the extension and contraction of the cable assembly within the headbow when the earpieces are adjusted. For instance, FIGS. 6A-6B show partial cutaway views of a headbow 642 of a headphone device, according to some additional example implementations.

Figure 6A:
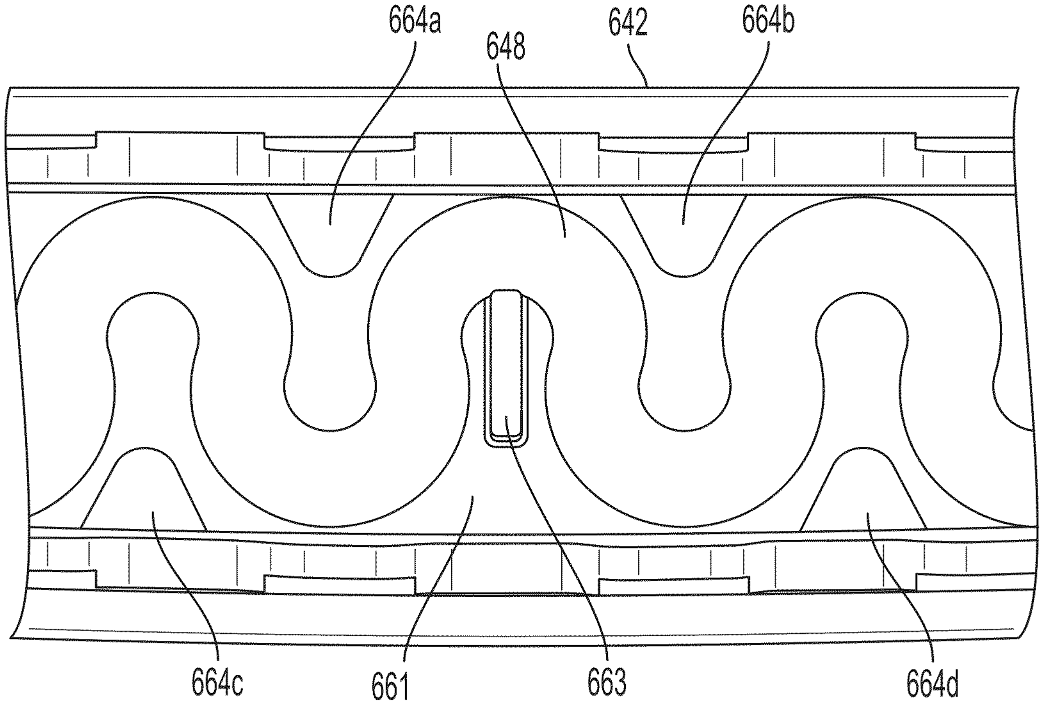
FIG. 6A is a partial cutaway view of a headbow of a headphone device, according to another example implementation.

FIG. 6A shows a close-up view of a headbow 642 that is similar to the headbow shown in FIGS. 4A-4C. For instance, the headbow 642 includes an inner cavity 661, within which a sinusoidally-shaped cable assembly 648 is positioned. In some implementations, the headbow 642 may include a center rib 663 that extends into the inner cavity 661. The center rib 663 may fix a midpoint, or an approximate midpoint, of the cable assembly 648 at a midpoint of the headbow 642. For example, the cable assembly 648 may be secured between the center rib 663 and a wall of the inner cavity 461 with an interference fit. This may increase the likelihood that the extension and retraction of the cable assembly 648 is distributed more evenly along its length, i.e., the extension of the left earpiece extends the left half of the cable assembly 648, while the extension of the right earpiece extends the right half of the cable assembly 648. Other configurations for the center rib 663 are also possible, as are other options for securing the midpoint or other points of the cable assembly 648 within the inner cavity 461, such as adhesives or other fasteners.

Further, the headbow 642 may be formed with features to help guide the cable assembly 648 back to its resting position after it has been extended. For example, the headbow may include a plurality of guide protrusions that extend into the inner cavity 461. FIG. 6A shows guide protrusions 664*a* and 664*b* that are positioned between adjacent peaks in the series of peaks in the sinusoidal shape of the cable assembly 648. Similarly, guide protrusions 664*c* and 664*d* are positioned between adjacent valleys in the series of valleys. As shown in FIG. 6A, the guide protrusions may include one or more inclined edges that force the cable assembly 648 toward a particular path as it is extended or retracted. This may help to reduce the likelihood that a portion of the cable assembly 648 buckles or becomes otherwise misaligned within the inner cavity 661 as it is retracted.

Figure 6B:
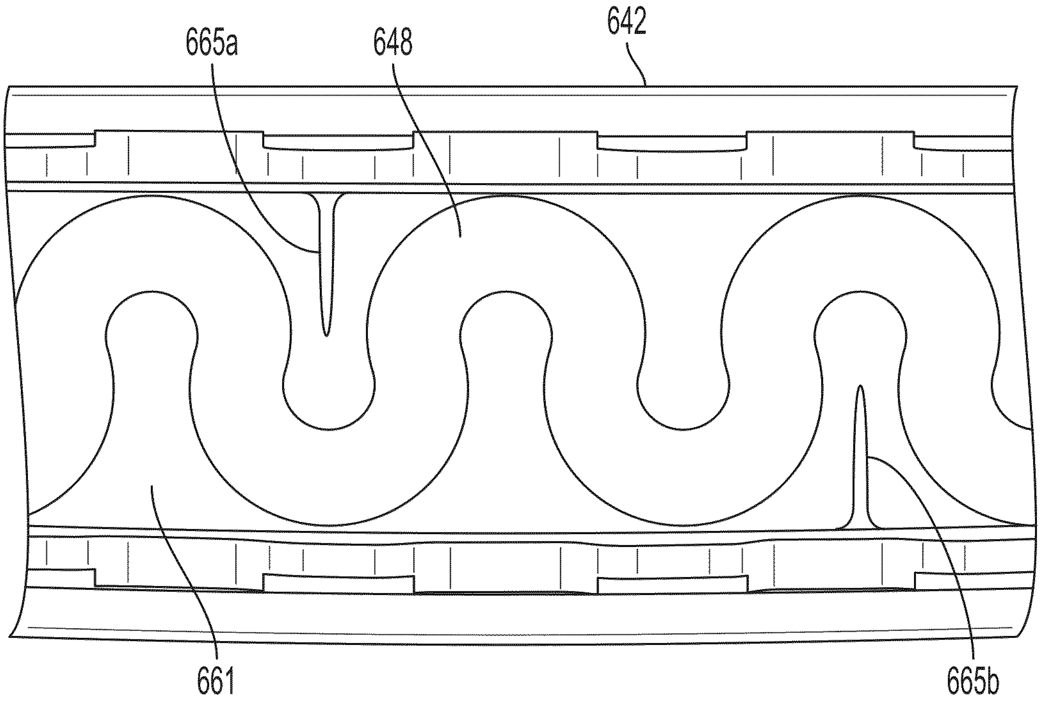
FIG. 6B is a partial cutaway view of a headbow of a headphone device, according to another example implementation.

FIG. 6B shows another example implementation of the headbow 642 that may assist with retraction of the cable assembly 648. As shown in FIG. 6B, the headbow 642 may additionally or alternatively include a plurality of flexible tabs that extend into the inner cavity 661. For example, the headbow 642 shown in FIG. 6B includes a first flexible tab 665*a* located between adjacent peaks of the cable assembly 648, and a second flexible tab 665*b* located between adjacent valleys. As the cable assembly 648 is extended and moves, for example, from left to right, the peaks and/or valleys of the cable assembly 648 may contact the flexible tabs 665*a* and 665*b* and force them to flex to the right. Similar to a spring, the flexible tabs may exert a force on the cable assembly 648 in the opposite direction, back to the left. Thus, when the earpiece is retracted, the flexible tabs 665*a* and 665*b* may bias the cable assembly toward its resting position.

In some implementations, the flexible tabs 665*a* and 665*b* may be formed from flexible plastic or another elastomer. In other examples, the flexible tabs may be metal or another material that will resiliently return to its original shape when a deforming load is removed. Further, the flexible tabs may be a composite element formed from, for example, a rigid tab that is coupled to a hinge spring. Other examples are also possible.

In some headbow designs, flexible tabs like those shown in FIG. 6B may be positioned between each peak and valley in the sinusoidal shape of the cable assembly 648. In other embodiments, the flexible tabs may be interspaced periodically within the inner cavity 661 of the headbow 642, such as between every other peak and valley. Other arrangements are also possible. Further, other configurations and locations of the flexible tabs that correspond to a different resting shape of the cable assembly 648 are also possible.

The example retraction mechanisms discussed above, including features included in the cable assembly and features included as part of the headbow, may be used in isolation or in any combination within a given headphone device.

Figure 7:
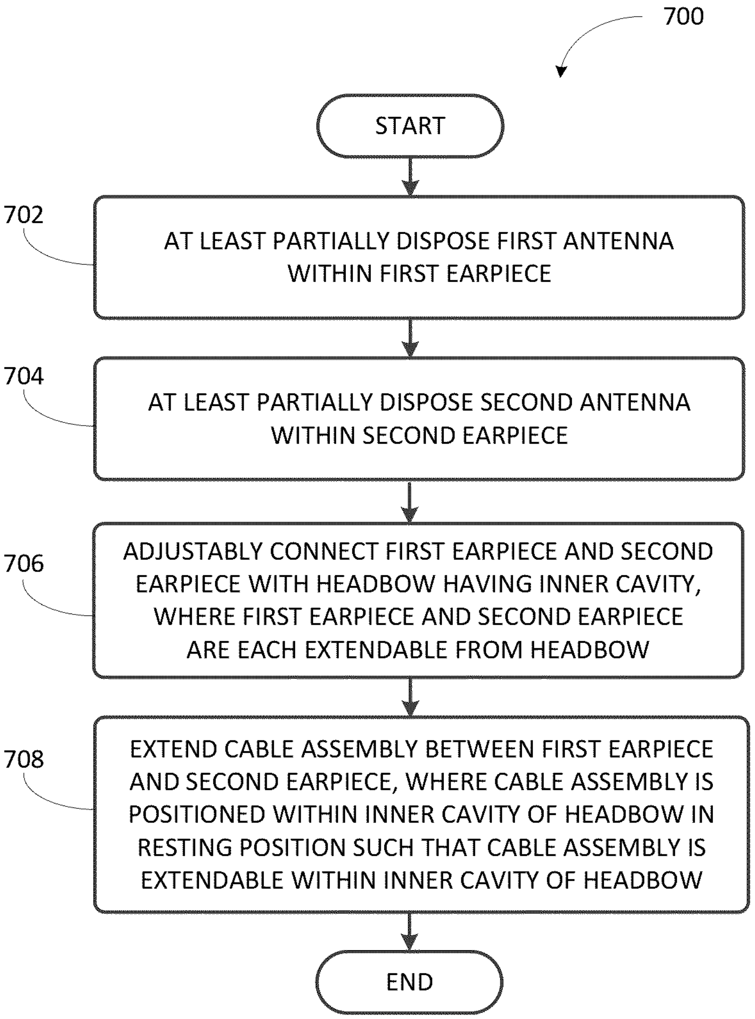
FIG. 7 shows a flowchart of an example method for assembling a headphone device.

Turning now to FIG. 7, a flowchart of a method 700 for assembling a headphone device is shown, according to an example implementation. Method 700 shown in FIG. 7 presents an example of a method that, for instance, could be used with the example headphone devices shown in FIGS. 2-6B and discussed herein. Further, for the method 700 and other processes and methods disclosed herein, the flowchart shows functionality and operation of one possible implementation of present examples. In this regard, each block in a flowchart may represent a module, a segment, or a portion of program code that includes one or more instructions executable by a processor for implementing or causing specific logical functions or steps in the process. For example, the method 700 may be implemented in whole or in part by one or more computing devices of a robotic assembly system. Alternative implementations are included within the scope of the examples of the present disclosure, in which functions may be executed out of order from that shown or discussed, including substantially concurrently, depending on the functionality involved, as would be understood by those reasonably skilled in the art.

At step 702, the method 700 includes at least partially disposing a first antenna within a first earpiece. For example, as discussed above with respect to FIG. 2, a first antenna 244*a* may be disposed in a first earpiece 241*a* of a headphone device 240. Similarly, at step 704, the method 700 includes at least partially disposing a second antenna, such as the second antenna 244*b*, within a second earpiece, such as the second earpiece 241*b*.

At step 706, the method 700 includes adjustably connecting the first earpiece 241*a* and the second earpiece 241*b* with a headbow 242. The headbow 242 includes an inner cavity, such as the inner cavity 461 shown with respect to the headbow 442 shown in FIGS. 4A-4C, within which a cable assembly 448*a* may be positioned. Further, the first earpiece 241*a* and the second earpiece 241*b* are adjustably connected to the headbow 242 such that they are each extendable from the headbow 242, as discussed in the examples above.

At step 708, the method 700 includes extending a cable assembly between the first earpiece 241*a* and the second earpiece 241*b*. For example, extending the cable assembly between the earpieces may include communicatively coupling the second antenna 244*b* in the second earpiece 241*b* to the communication circuitry 247 in the first earpiece 241*a*, which may include a wireless receiver, among other components.

In some implementations, the method 700 may include thermoforming a cable, such as the cable 350, into a sinusoidal pattern having a series of peaks and valleys when the cable 350 is in a resting position. For example, the cable 350 may be at least partially formed from an elastomeric material, such as a thermoplastic elastomer, as discussed above.

Further, the method 700 may include coupling one or more elastomeric bands to the cable at a plurality of connection points, as shown in FIGS. 5A-5B. For example, the connection points may be located at the series of peaks and/or valleys of the sinusoidal pattern. Additionally or alternatively, an elastomeric band may be coupled to the cable at connection points located between the series of peaks and valleys. In some implementations, the method 700 may include coupling an elastomeric strip to the cable, as shown in FIG. 5C and discussed above.

The cable assembly may be positioned within the inner cavity of the headbow, as shown in the headbow 442 of FIGS. 4A-4B. Further, the method 700 may include fixing a first end of the cable assembly, such as the cable assembly 448*a*, within a first shaft, such as the first shaft 462*a*. Similarly, the method 700 may include fixing a second end of the cable assembly 448*a* within a second shaft, such as the second shaft 462*b*. The first shaft 462*a* and the second shaft 462*b* may each be slidable within the inner cavity 461 to extend the respective earpieces from the headbow 442.

As noted previously, the method 700 may further include positioning the cable assembly 448*a* within the inner cavity 461 in a resting position such that the cable assembly 448*a* is extendable within the inner cavity 461 of the headbow 442. For instance, the cable assembly 448*a* may be extendable from the resting position when one or both of the first and second earpieces are extended from the headbow 442. In some implementations, the method 700 may include fixing an approximate midpoint of the cable assembly 448*a* at a midpoint of the headbow 442 via a center rib that extends into the inner cavity 461, such as the center rib 663 shown in FIG. 6A and discussed above. Further, the method 700 may include forming the headbow with one or more guide protrusions and/or flexible tabs extending into the inner cavity, as shown in the examples of FIGS. 6A-6B and discussed above.

IV. Conclusion

The above discussions relating to playback devices such as headphone devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A headphone device comprising:

a first earpiece;

a second earpiece;

a headbow adjustably connecting the first earpiece and the second earpiece, wherein one or both of the first and second earpieces are extendable from the headbow, and wherein the headbow comprises (i) an inner cavity and (ii) a fastener positioned within the inner cavity at an approximate midpoint of the headbow; and a cable assembly comprising a cable that is formed into a sinusoidal pattern having a series of peaks and valleys when the cable assembly is in a resting position, wherein:

the cable assembly is at least partially positioned within the inner cavity of the headbow and is fixed, at the approximate midpoint of the headbow, via the fastener of the headbow;

a first portion of the cable assembly extends between (i) the first earpiece and (ii) the approximate midpoint of the headbow such that the first portion of the cable assembly is extendable, along the extent of the first portion of the cable assembly within the inner cavity of the headbow, from the resting position when the first earpiece is extended from the headbow; and a second portion of the cable assembly extends between (i) the second earpiece and (ii) the approximate midpoint of the headbow such that the second portion of the cable assembly is extendable, along the extent of the second portion of the cable assembly within the inner cavity of the headbow, from the resting position when the second earpiece is extended from the headbow.

2. The headphone device of claim 1, wherein the cable comprises a cable jacket that is at least partially formed from an elastomeric material.

3. The headphone device of claim 2, wherein the cable assembly comprises an elastomeric band coupled to the cable jacket at a plurality of connection points between the series of peaks and valleys.

4. The headphone device of claim 3, wherein the cable jacket passes through pre-formed holes in the elastomeric band that form the plurality of connection points between the series of peaks and valleys.

5. The headphone device of claim 3, wherein the elastomeric band is formed from the elastomeric material and is formed with the cable jacket as an integrated structure.

6. The headphone device of claim 2, wherein the cable assembly comprises a first elastomeric band coupled to the cable jacket at a plurality of peaks in the series of peaks and valleys, and a second elastomeric band coupled to the cable jacket at a plurality of valleys in the series of peaks and valleys.

7. The headphone device of claim 2, wherein the cable assembly comprises an elastomeric strip having a width that encompasses the series of peaks and valleys, and wherein the elastomeric strip is coupled to the cable jacket at a plurality of points along the sinusoidal pattern.

8. The headphone device of claim 1, wherein the first earpiece comprises an antenna at least partially disposed within the first earpiece.

9. The headphone device of claim 8, wherein the antenna is a first antenna, wherein the first earpiece further comprises a wireless receiver disposed within the first earpiece, and wherein the second earpiece comprises a second antenna that is at least partially disposed within the second earpiece and is communicatively coupled to the wireless receiver via the cable assembly.

10. The headphone device of claim 1, wherein the cable has an outer diameter that is greater than 4.0 mm.

11. The headphone device of claim 1, wherein the fastener comprises a center rib positioned within the inner cavity of the headbow, wherein the center rib fixes the approximate midpoint of the cable assembly at the approximate midpoint of the headbow via an interference fit with a wall of the inner cavity.

12. The headphone device of claim 1, wherein the first earpiece is extendable from the headbow via a first shaft that is slidable within the inner cavity and wherein the second earpiece is extendable from the headbow via a second shaft that is slidable within the inner cavity.

13. The headphone device of claim 12, wherein a first an end of the first portion of the cable assembly is fixed within the first shaft, and wherein a second an end of the second portion of the cable assembly is fixed within the second shaft.

14. The headphone device of claim 1, wherein the approximate midpoint of the headbow is a mid point midpoint along a length of the headbow.

15. A method of assembling a headphone device, the method comprising:

adjustably connecting a first earpiece and a second earpiece with a headbow having (i) an inner cavity and (ii) a fastener positioned within the inner cavity at an approximate midpoint of the headbow;

forming a cable assembly comprising a cable into a resting position, wherein the cable is formed into a sinusoidal pattern having a series of peaks and valleys when the cable assembly is in the resting position;

extending the cable assembly between the first earpiece and the second earpiece such that (i) a first portion of the cable assembly extends between (a) the first earpiece and (b) the approximate midpoint of the headbow within the inner cavity of the headbow and (ii) a second portion of the cable assembly extends between (a) the second earpiece and (b) the approximate midpoint of the headbow; and fixing, via the fastener of the headbow, an approximate midpoint of the cable assembly within the inner cavity of the headbow at the approximate midpoint of the headbow such that (i) the first portion of the cable assembly is extendable, along the extent of the first portion of the cable assembly within the inner cavity of the headbow, from the resting position when the first earpiece is extended from the headbow and (ii) the second portion of the cable assembly is extendable, along the extent of the second portion of the cable assembly within the inner cavity of the headbow, from the resting position when the second earpiece is extended from the headbow.

16. The method of claim 15, wherein the cable comprises a cable jacket that is at least partially formed from an elastomeric material.

17. The method of claim 16, wherein the cable assembly further comprises an elastomeric band, the method further comprising:

coupling the elastomeric band to the cable jacket at a plurality of connection points between the series of peaks and valleys.

18. The method of claim 15, further comprising:

at least partially disposing an antenna within the first earpiece.

19. The method of claim 18, wherein the antenna is a first antenna, the method further comprising:

at least partially disposing a wireless receiver within the first earpiece;

at least partially disposing a second antenna within the second earpiece; and communicatively coupling the second antenna to the wireless receiver via the cable assembly.

20. The method of claim 15, wherein fixing, via the fastener of the headbow, the approximate midpoint of the cable assembly within the inner cavity of the headbow at the approximate midpoint of the headbow comprises fixing, via the fastener of the headbow, the approximate midpoint of the cable assembly within the inner cavity of the headbow at a midpoint along a length of the headbow.

* * * * *